United States Patent
Nakata

(10) Patent No.: US 7,009,371 B2
(45) Date of Patent: Mar. 7, 2006

(54) DC/DC CONVERTER

(75) Inventor: Kenichi Nakata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 7 days.

(21) Appl. No.: 10/897,026

(22) Filed: Jul. 23, 2004

(65) Prior Publication Data
US 2005/0024033 A1 Feb. 3, 2005

(30) Foreign Application Priority Data
Jul. 31, 2003 (JP) ............... 2003-283305

(51) Int. Cl.
G05F 1/40 (2006.01)
(52) U.S. Cl. .............. 323/282; 323/901; 323/222
(58) Field of Classification Search ............ 323/222, 323/282, 284, 901
See application file for complete search history.

(56) References Cited

U.S. PATENT DOCUMENTS 6,025,706 A * 2/2000 Takimoto et al. ........... 323/282

FOREIGN PATENT DOCUMENTS

JP 09-121535 5/1997

* cited by examiner

Primary Examiner—Shawn Riley
(74) Attorney, Agent, or Firm—Arent Fox, PLLC.

(57) ABSTRACT

The present invention provides a DC/DC converter that can include a capacitor constituting a soft start circuit in a semiconductor integrated device. This DC/DC converter is comprised of a switching element for supplying power from a power supply ($V_{cc}$) to a load side output terminal (OUT) by switching, an error amplifier for amplifying the voltage from the load side output terminal (OUT), a differentiation circuit for differentiating the voltage from the load side output terminal (OUT) and adjusting the output current according to the value thereof, a soft start circuit comprising a constant current source and a capacitor, both of which are connected to the output terminal of the differentiation circuit, and a comparator for comparing the triangular wave voltage from a triangular wave generator (TRI) with the voltage from the soft start circuit or the output voltage of the error amplifier, and controlling the switching of the switching element according to the comparison output thereof.

4 Claims, 3 Drawing Sheets

DC/DC CONVERTER

BACKGROUND OF THE INVENTION

1. Field of the Invention

The present invention relates to a DC/DC converter for converting the power supply voltage to be input into a predetermined DC voltage, and more particularly to a DC/DC converter having a soft start function.

2. Description of the Related Art

A method of a DC/DC converter is installing a switching element between a terminal for inputting power supply and a terminal which is connected to a load and outputs a predetermined DC voltage, and maintaining the predetermined DC voltage by switching this switching element. This method has been widely used because high efficiency can be achieved with a compact size (e.g. Japanese Patent Application Laid-Open No. H9-121535). And this method allows to construct various DC/DC converters, such as the step-up type, step-down type and step-up/down type depending on the circuit configuration around the switching element. In these DC/DC converters, a soft start circuit is normally installed to control rush current, which flows into the switching element when power is started up.

FIG. 5 is a circuit diagram of a conventional DC/DC converter. This DC/DC converter 101 is a step-up type, and is comprised of an NMOS transistor 114 which is a switching element, and a coil 115 for storing boosting energy between the drain thereof and power supply ($V_{cc}$). Between these connecting points and the load side output terminal (OUT), a reverse blocking diode 116 and a smoothing capacitor 117 are connected. In this circuit configuration, the voltage of the load side output terminal (OUT) is adjusted by controlling the ON time of the NMOS transistor 114 using the feedback circuit, which will be described next.

The feedback circuit is comprised of an output voltage detection circuit 106, error amplifier 111, triangular wave generator (TRI) 112, comparator 110 that has two non-inversion input terminals, and output buffer 113. In other words, the output voltage detection circuit 106 detects the voltage of the load side output terminal (OUT), the error amplifier 111 receives the output voltage thereof, amplifies it and outputs it to one of the non-inversion input terminals, the comparator 110 compares this output voltage and the triangular wave voltage generated by the triangular wave generator (TRI) 112, and this comparison result output is input to the gate of the NMOS transistor 114 via the output buffer 113, so as to control the ON time of the NMOS transistor 114.

The soft start circuit 105 is also installed to control the rush current which flows into the NMOS transistor 114 when power supply ($V_{cc}$) is started up. This circuit is comprised of a constant current source 122 and a capacitor 123, and generates a voltage which rises gradually. This voltage is output to the other non-inversion input terminal of the comparator 110. And when the power supply ($V_{cc}$) is started up, the output voltage of the soft start circuit 105 and the above mentioned triangular wave voltage are compared by the comparator 110.

SUMMARY OF THE INVENTION

As described above, the soft start circuit 105, for generating voltage that gradually starts up, supplies the micro-current from the constant current source 122 to the capacitor 123, and generates a voltage that gradually starts up in the capacitor 123. This capacitor 123 cannot be included in the semiconductor integrated device 102, and is installed as an external component. This is because the capacitor 123 requires a large capacitance since it takes 1 milliseconds to 10 milliseconds from the startup of the power supply as a soft start operation period for controlling the rush current that flows through the NMOS transistor 114. For example, if the current of the constant current source 122 is 10 µA under the conditions that the output voltage of the soft start circuit 105 linearly rises and becomes about 1V 5 milliseconds later, then about 0.05 µF of large capacitance is required for the capacitor. In practical terms it is difficult to form such a large capacitance capacitor on the semiconductor substrate because it occupies too much area.

If the current of the constant current source 122 is decreased, to 20 nA for example, and the output voltage of the soft start circuit 105 becomes about 1V 5 milliseconds later, then the capacitance of the capacitor becomes 100 pF. If a capacitor with such capacitance is used, it is possible to include it in the semiconductor integrated device. However if the current of the constant current source 122 is 100 nA or less micro-current, then the leak current which is generated at the PN junction, for example, of the transistors constituting the constant current source 122 reaches a level that cannot be ignored under the high temperature condition, and the soft start circuit 105 may have operation problems. Therefore decreasing the current of the constant current source 122 has a limitation, and should be about 10 µA for practical use.

If the external capacitor constituting the soft start circuit can be included in the semiconductor integrated circuit, the area on the printed circuit board occupied by the external capacitor can be decreased, and also the semiconductor package can be decreased since the terminal for the external capacitor is unnecessary, so as a result, the downsizing of the DC/DC converter can be implemented.

With the foregoing in view, it is an object of the present invention to provide a DC/DC converter which can include the capacitor constituting the soft start circuit in the semiconductor integrated device.

To solve the above problem, the DC/DC converter of the present invention comprises a switching element for supplying power from a power supply to a load side output terminal and holding the load side output terminal at an output setting voltage by switching, an error amplifier for amplifying the error between the voltage from the load side output terminal and a error comparison reference voltage, a differentiation circuit for differentiating the voltage from the load side output terminal, a soft start circuit comprising a constant current source and a capacitor that are connected to an output terminal of the differentiation circuit, for generating voltage that gradually rises when the power supply is started up, a triangular wave generator for generating triangular waves, and a comparator for comparing the triangular wave voltage and the voltage from the soft start circuit when the power supply is started up, comparing the triangular wave voltage and the output voltage of the error amplifier during normal operation after the power supply is started up, and controlling the switching of the switching element by the comparison output thereof.

In the DC/DC converter of the present invention, the differentiation circuit functions such that current, according to the rising rate of the output voltage of the load side output terminal, is drawn out from the soft start circuit when the power supply is started up, so the required time, until the output voltage of the load side output terminal becomes the setting voltage, can be spent while controlling the rush current of the switching element. Therefore the capacitance of the capacitor constituting the soft start circuit can be decreased so as to be included in the semiconductor integrated device, the area on the printed circuit board occupied by the semiconductor integrated device can be decreased, and the semiconductor package size can be decreased.

DESCRIPTION OF THE PREFERRED EMBODIMENTS

Figure 1:
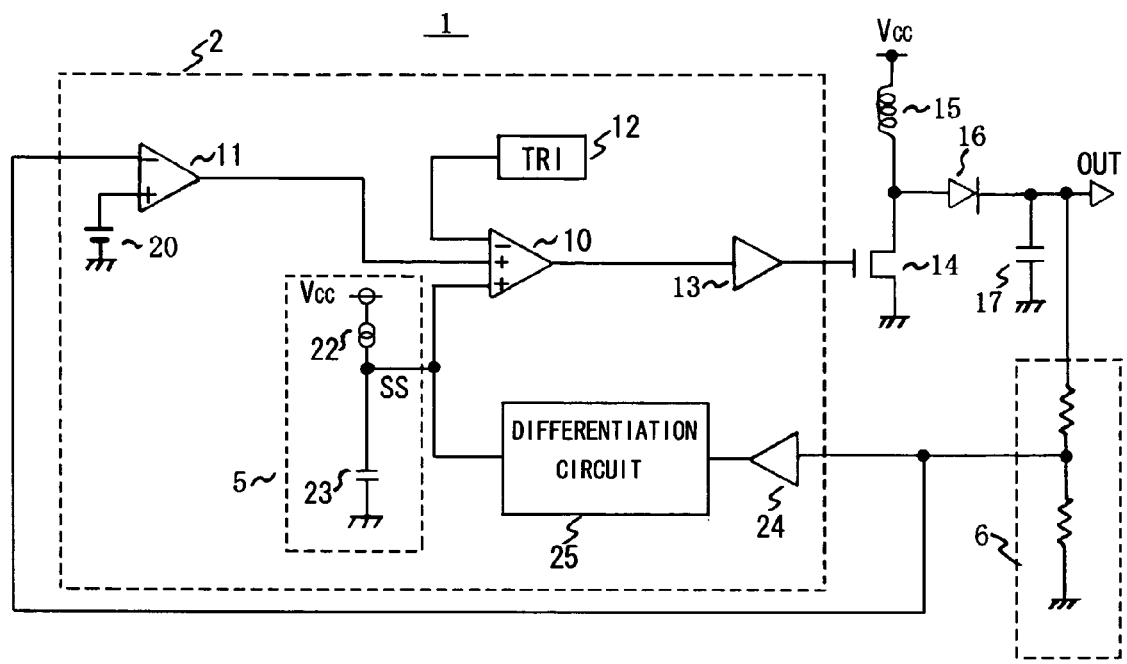
FIG. 1 is a circuit diagram of the DC/DC converter according to an embodiment of the present invention.

Embodiments of the present invention will now be described with reference to the accompanying drawings. FIG. 1 is a circuit diagram of the DC/DC converter 1 according to an embodiment of the present invention.

The DC/DC converter 1 comprises an NMOS transistor 14, which is a switching element for supplying power from a power supply ($V_{cc}$) to a load side output terminal (OUT) and holding the load side output terminal (OUT) at an output setting voltage by switching, an error amplifier 11 for amplifying the error between the voltage from the load side output terminal (OUT) and the voltage of the error comparison reference power supply 20 (error comparison reference voltage), a differentiation circuit 25 for differentiating the voltage from the load side output terminal (OUT), a soft start circuit 5 comprising a constant current source 22 and a capacitor 23 that are connected in series, connecting an output terminal of the differentiation circuit 25 to an output terminal (SS) between the constant current source 22 and capacitor 23, a triangular wave generator (TRI) 12 for generating triangular wave voltage, and a comparator 10 comprising two non-inversion input terminals, where triangular wave voltage is input to the inversion input terminal, the output voltage of the error amplifier 11 is input to one of the non-inversion input terminals, and the output voltage ($V_{ss}$) of the soft start circuit 5 is input to the other non-inversion input terminal respectively, for outputting the comparison result to the NMOS transistor 14. The comparator 10 compares the lower one of the voltages that are input to the two non-inversion input terminals and the voltage that is input to the inversion input terminal. In other words, the comparator 10 compares the output voltage ($V_{ss}$) of the soft start circuit 5 and the triangular wave voltage when the power supply ($V_{cc}$) is started up, and the output voltage of the error amplifier 11 and the triangular wave voltage during normal operation after the power supply ($V_{cc}$) is started up, so as to control the switching of the NMOS transistor 14. Here the capacitor 23 constituting the soft start circuit 5 along with the constant current source 22 is included in the semiconductor integrated device 2, since the capacitance thereof is as small as about 100 pF.

In more detail, a coil 15 for storing energy for boosting is connected between the drain (output terminal) and the power supply ($V_{cc}$) of the NMOS transistor 14. And a diode 16 for blocking the reverse current and a smoothing capacitor 17 for smoothing the voltage are connected between the drain of the NMOS transistor 14 and the load side output terminal (OUT). An output voltage detection circuit 6 for detecting the voltage of the load side output terminal (OUT) is connected to the load side output terminal (OUT). The output voltage detection circuit 6 is comprised of two resistors which are connected in series between the load side output terminal (OUT) and the ground, and the connection point of the two resistors is connected to the inversion input terminal of the error amplifier 11, and the differentiation circuit 25 via the input buffer 24, respectively. The output terminal of the differentiation circuit 25 is connected to the output terminal (SS) of the soft start circuit 5 as mentioned above, and is connected to the other non-inversion input terminal of the comparator 10. The error comparison reference voltage is input to the non-inversion input terminal of the error amplifier 11, and the output terminal thereof is connected to one of the non-inversion input terminals of the comparator 10. The triangular wave voltage from the triangular wave generator 12 is input to the inversion input terminal of the comparator 10, and the output terminal thereof is connected to the gate, which is a control input terminal, of the NMOS transistor 14 via the output buffer 13.

In this way, the output voltage detection circuit 6, error amplifier 11, comparator 10 and output buffer 13 constitute one feedback circuit (first feedback circuit), and the output voltage detection circuit 6, input buffer 24, differentiation circuit 25, soft start circuit 5, comparator 10 and output buffer 13 constitute the other feedback circuit (second feedback circuit). Whether the first feedback circuit operates or the second feedback circuit operates is determined by one of the voltages to be input to the two non-inversion input terminals of the comparator 10 which is lower. The former operates during normal operation after the power supply ($V_{cc}$) is started up, and the latter operates when the power supply ($V_{cc}$) is started up.

Now normal operation after the power supply ($V_{cc}$) is started up will be described.

In the DC/DC converter 1, if the output voltage ($V_{OUT}$) of the load side output terminal (OUT) slightly shifts from the setting voltage, the shift of the voltage is amplified by the error amplifier 11 and input to the comparator 10. Then the output pulse width of the comparator 10 changes and controls the switching of the NMOS transistor 14 via the output buffer 13, and functions such that the output voltage ($V_{OUT}$) of the load side output terminal (OUT) is returned to the setting voltage. This is how the first feedback circuit operates.

Figure 3:
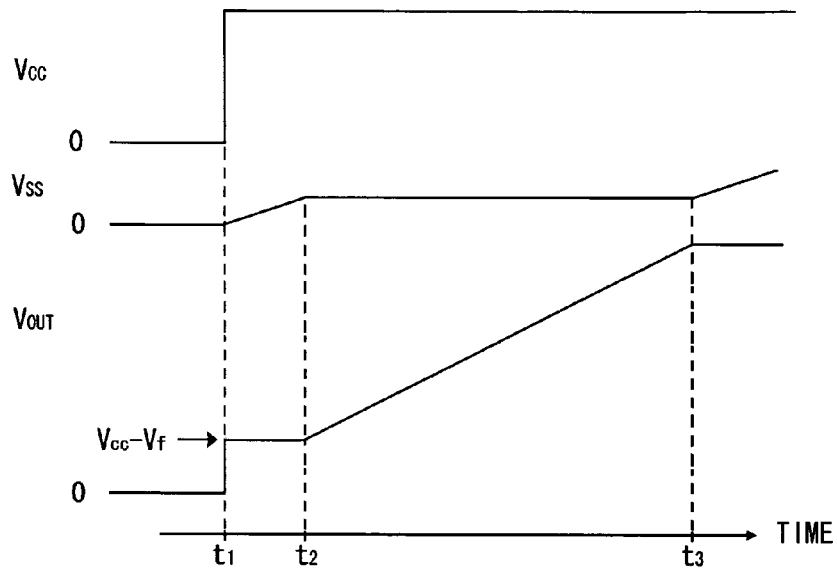
FIG. 3 is a waveform diagram when the power supply of the above DC/DC converter is started up.

Now operation when the power supply ($V_{cc}$) is started up will be described with reference to FIG. 3.

The soft start circuit 5 generates and outputs voltage ($V_{ss}$) which gradually rises when the power supply is started up. The voltage ($V_{ss}$) rises from 0V from the time point t1 immediately after the power supply is started up, and reaches the bottom voltage of the triangular wave at the time point t2, and during this time the NMOS transistor 14 does not turn ON and the output voltage ($V_{OUT}$) of the load side output terminal (OUT) remains constant at the voltage that is the amount of the forward bias voltage ($V_f$) of the diode 16 subtracted from the power supply ($V_{cc}$). Therefore the input voltage of the differentiation circuit 25 does not fluctuate and is also a constant value. The result when the constant value is differentiated is 0, so the differentiation circuit 25 does not influence the output voltage ($V_{ss}$) of the soft start circuit 13. Therefore during this time, the degree of rising (rising rate) of the output voltage ($V_{ss}$) of the soft start circuit 13 is determined only by the current value of the constant current source 22 and the capacitance value of the capacitor 23. The capacitor 23 has a small capacitance value, as mentioned above, and the rising rate thereof is relatively high (inclination angle is large).

When the output voltage ($V_{ss}$) of the soft start circuit 5 rises further and reaches the time point t2 when the output voltage ($V_{ss}$) exceeds the bottom voltage of the triangular wave, pulses are output from the comparator 10, and the NMOS transistor 14 turns ON. By this, energy is stored in the coil 15, and the anode voltage of the diode 16 becomes higher than the power supply ($V_{cc}$) by the counter electromotive force generated in the coil 15. As a result, current flows through the diode 16, and the stored charge amount of the smoothing capacitor 17 increases, which also increases the output voltage ($V_{OUT}$) of the load side output terminal (OUT).

When the output voltage ($V_{OUT}$) of the load side output terminal (OUT) starts rising, the output voltage of the output voltage detection circuit 6 is input to the differentiation circuit 25 via the input buffer 24, and the voltage thereof also rises, so the differentiation circuit 25 starts to draw out current according to the rising rate thereof from the output terminal (SS) of the soft start circuit 5. Here if the rising rate of the input voltage to the differentiation circuit 25 is high, the current value to be drawn out by the differentiation circuit 25 is high, and if the rising rate is low, the current value to be drawn out is low. Therefore negative feedback is activated, so that the output voltage ($V_{OUT}$) of the load side output terminal (OUT) does not suddenly rise, and as a result, the ON time of the NMOS transistor 14 is restricted and rush current thereof is controlled.

By this function of the negative feedback, the current supplied from the constant current source 22 in the soft start circuit 5 is mostly drawn out by the differentiation circuit 25, and the output voltage ($V_{ss}$) of the soft start circuit 5 becomes roughly a constant value. During this time as well, the output voltage ($V_{OUT}$) of the load side output terminal (OUT) continues rising until it becomes the setting voltage, at the time point t3. Even if the current value of the constant current source 22 is set to about 10 $\mu$A, for example, it is drawn out by the differentiation circuit 25, so it takes a required time until the output voltage ($V_{OUT}$) of the load side output terminal (OUT) becomes the setting voltage, even if the capacitor has a small capacitance value of about 100 pF.

When the output voltage ($V_{OUT}$) of the load side output terminal (OUT) reaches the setting voltage at the time point t3, the output voltage of the error amplifier 11 drops, so the above mentioned first feedback circuit activates and keeps the output voltage ($V_{OUT}$) of the load side output terminal (OUT) at the setting voltage. As a result, the differentiation circuit 25 no longer draws out current from the output terminal (SS) of the soft start circuit 13, and the voltage thereof ($V_{ss}$) starts to rise again. From here on, the operation is the same as the above mentioned normal operation, where the second feedback circuit, including the soft start circuit 5, does not influence the operation of the DC/DC converter 1.

Figure 2:
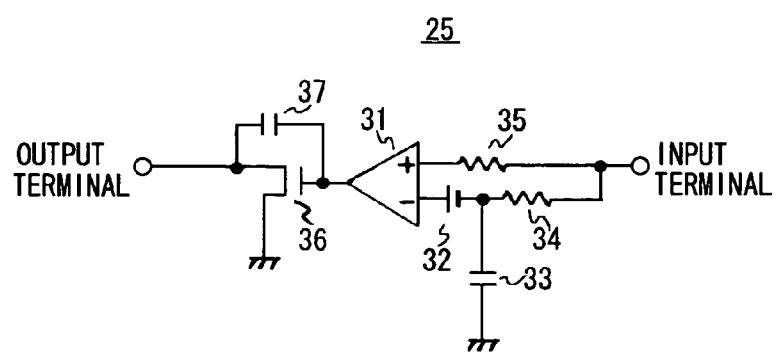
FIG. 2 is a circuit diagram of the differentiation circuit of the above DC/DC converter.

Now the configuration of the differentiation circuit 25 will be described. FIG. 2 is a circuit diagram thereof. This differentiation circuit 25 is comprised of resistors 34 and 35 which are connected in parallel to the input terminal thereof, a grounded capacitor 33 and offset voltage source 32 which are connected to the other end of the resistor 34, an amplifier 31 of which inversion input terminal the anode of the offset voltage source 32 is connected to, and of which non-inversion input terminal the other end of the resistor 35 is connected to, an NMOS transistor 36 of which gate is connected to output of the amplifier 31, of which drain is connected to the output terminal of the differentiation circuit 25 to draw out the current of the soft start circuit 5 and of which source is grounded, and a capacitor 37 which is connected between the drain and gate of the NMOS transistor 36 for stopping the oscillation of the second feedback circuit, that is, for phase compensation. Here the input terminal of the differentiation circuit 25 is connected to the output of the input buffer 24, and the output terminal is connected to the output of the soft start circuit 5 respectively. This differentiation circuit 25 only draws out current of the soft start circuit 5 from the output terminal thereof, and does not supply current to the soft start circuit 5. Therefore the output format thereof is an open drain type. This NMOS transistor 36, which is an output transistor, can be replaced with an open collector type NPN transistor.

If the voltage of the input terminal of the differentiation circuit 25 is a constant voltage, the input voltage of the inversion input terminal of the amplifier 31 is higher than the input voltage of the non-inversion input terminal for the amount of the offset voltage. The offset voltage is set to a micro-voltage, and in this case, the offset voltage is set to a level with which the amplifier 31 can output the ground voltage. If the amplifier 31 outputs the ground voltage in this way, the NMOS transistor 36 does not draw out current from the output terminal of the differentiation circuit 25.

When the voltage of the input terminal of the differentiation circuit 25 rises and time elapses, the difference of the non-inversion input terminal voltage from the inversion input terminal voltage in the amplifier 31 is about ACR-E, where A is the rising rate, C is the capacitance of the capacitor 33, R is the resistance value of the resistor 34 and E is the offset voltage. The amplifier 31 outputs the voltage when this difference is amplified to the gate of the NMOS transistor 36, and according to this voltage, the NMOS transistor 36 draws out the current from the output terminal of the differentiation circuit 25. Specifically, if the rising rate is high, the current value to be drawn out by the NMOS transistor 36 is high, and if the rising rate is low, the current value to be drawn out is low.

In this way, the differentiation circuit 25 draws out the current from the output terminal of the differentiation circuit 25 by the NMOS transistor 36 according to the rising rate of the voltage of the input terminal thereof. By activating this differentiation circuit 25, the soft start operation period can be increased, and specifically, the soft start operation period can be about 5 milliseconds by setting the capacitance value C of the capacitor 33 and the resistance value R of the resistor 34.

The output voltage detection circuit 6 in the DC/DC converter 1 is shared by the first and second feedback circuits, but can certainly be installed separately.

Figure 4:
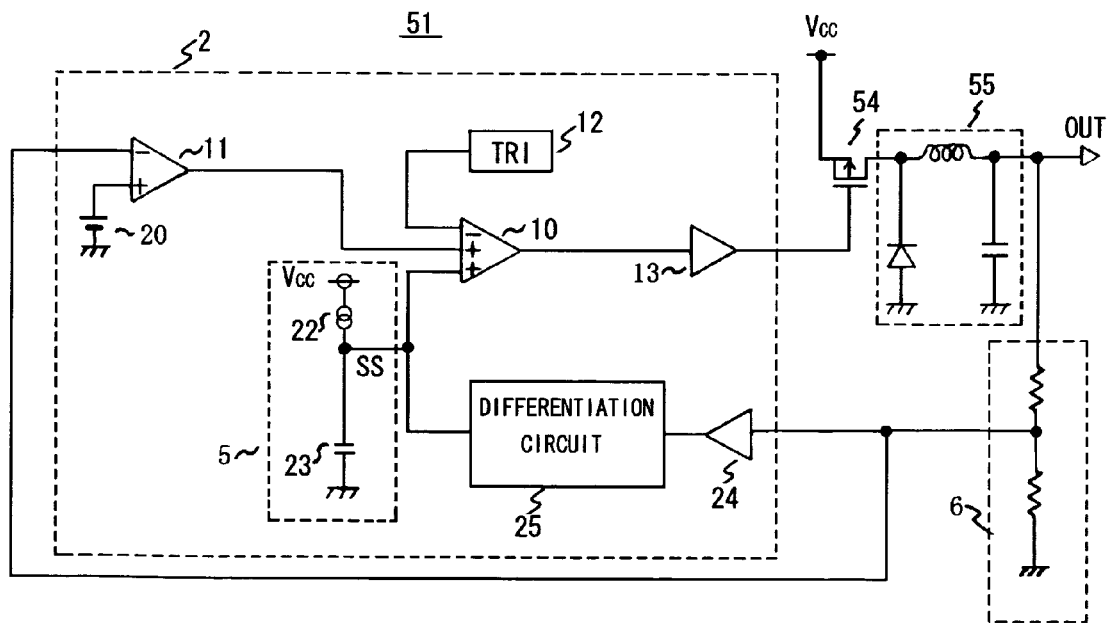
FIG. 4 is a circuit diagram of the DC/DC converter according to another embodiment of the present invention.
Figure 5:
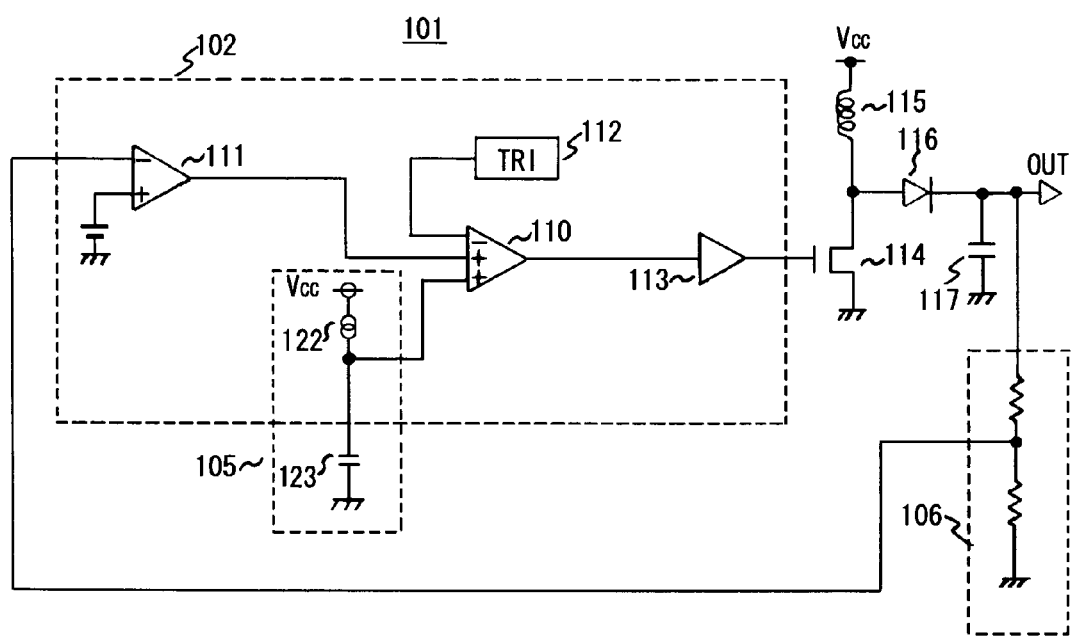
FIG. 5 is a circuit diagram of the DC/DC converter of a prior art.

FIG. 4 shows a DC/DC converter according to another embodiment of the present invention. The above embodiment is a step-up type, but this is a step-down type. Just like the above mentioned step-up type, this DC/DC converter 51 performs operation when the power supply is started up and during normal operation thereafter. Between the power supply ($V_{cc}$) and the load side output terminal (OUT), the NMOS transistor 54, which is a switching element, and a smoothing circuit 55 comprised of a diode, coil and capacitor, are connected. The configuration of the first and second feedback circuits from the load side output terminal (OUT) and the input of the NMOS transistor 54 is substantially the same as the above mentioned embodiment. In this DC/DC converter 51 as well, the capacitor 23 constituting the soft start circuit 5 can be included in the semiconductor integrated circuit 2 by using the differentiation circuit 25.

The present embodiment is not limited to the above mentioned embodiment, but the design can be changed in various ways within the scope of the particulars stated in the claims.

What is claimed is:

1. A DC/DC converter, comprising:
   a switching element for supplying power from a power supply to a load side output terminal and holding the load side output terminal at an output setting voltage by switching;
   an error amplifier for amplifying the error between the voltage from the load side output terminal and a error comparison reference voltage;
   a differentiation circuit for differentiating the voltage from the load side output terminal;
   a soft start circuit comprising a constant current source and a capacitor that are connected to an output terminal of the differentiation circuit, for generating voltage that gradually rises when the power supply is started up;
   a triangular wave generator for generating triangular waves; and
   a comparator for comparing the triangular wave voltage and the voltage from the soft start circuit when the power supply is started up, comparing the triangular wave voltage and the output voltage of the error amplifier during normal operation after the power supply is started up, and controlling the switching of said switching element by the comparison output thereof.

2. The DC/DC converter according to claim 1, wherein said constant current source and said capacitor are included in a same semiconductor integrated device.

3. The DC/DC converter according to claim 1, wherein the transistor for executing the output of said differentiation circuit is an open drain or open collector.

4. The DC/DC converter according to claim 3, wherein said constant current source and said capacitor are included in a same semiconductor integrated device.

\* \* \* \* \*